W. O. LUM.
CONTROLLING MEANS FOR ELECTRIC CIRCUITS.
APPLICATION FILED FEB. 27, 1911.
1,339,466.
Patented May 11, 1920.
2 SHEETS—SHEET 1.
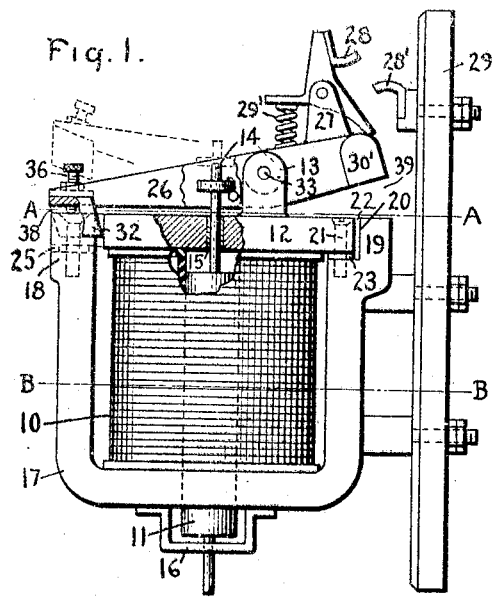
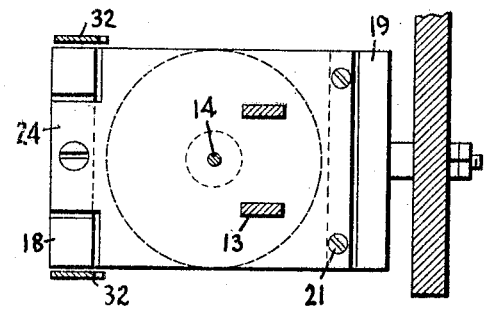
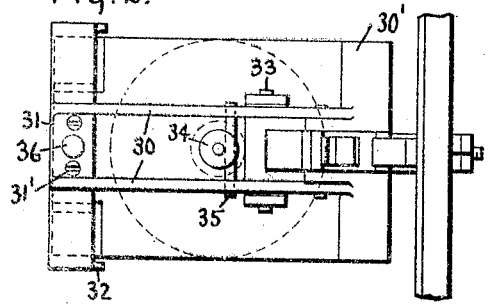
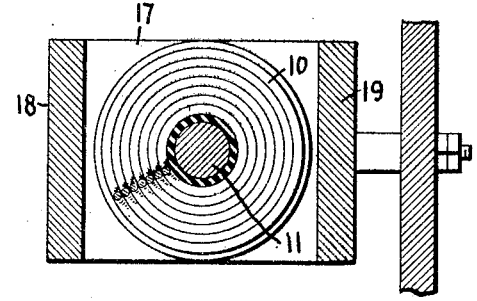
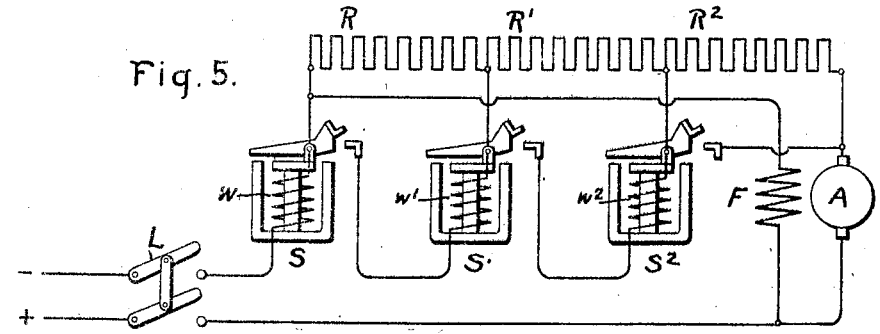
Witnesses:
Irving E. Deeus
Marcus L. Byng
Inventor
Walter O. Lum,
by Albert G. Davis
His Attorney.

W. O. LUM.
CONTROLLING MEANS FOR ELECTRIC CIRCUITS.
APPLICATION FILED FEB. 27, 1911.
1,339,466.
Patented May 11, 1920.
2 SHEETS—SHEET 2.
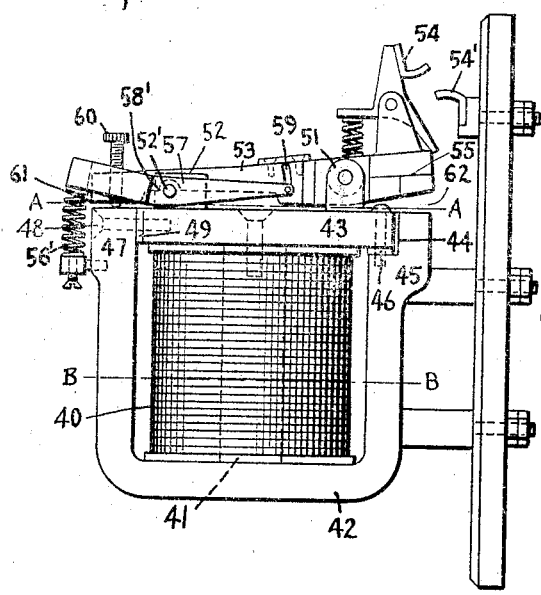
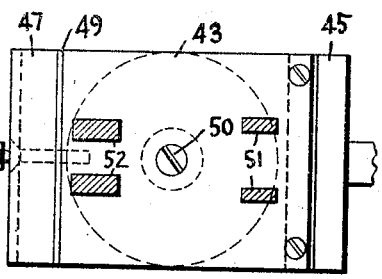
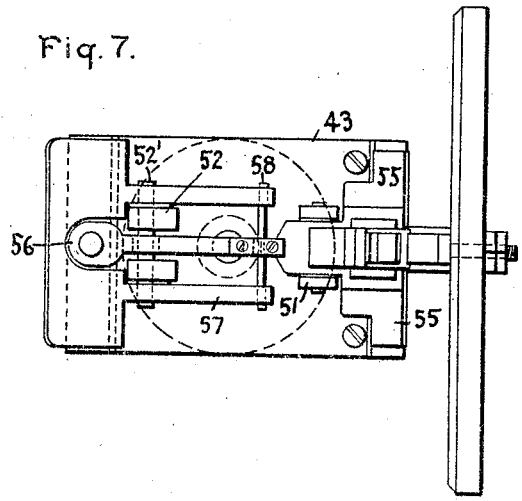
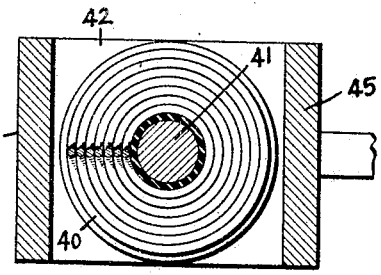
Witnesses:
Irving E. Steers
Marcus L. Byng
Inventor
Walter O. Lum,
by Albert G. Davis
His Attorney.

UNITED STATES PATENT OFFICE.

WALTER O. LUM, OF AMSTERDAM, NEW YORK, ASSIGNOR TO GENERAL ELECTRIC COMPANY, A CORPORATION OF NEW YORK.

CONTROLLING MEANS FOR ELECTRIC CIRCUITS.

1,339,466.      Specification of Letters Patent.      Patented May 11, 1920.

Application filed February 27, 1911. Serial No. 611,151.

*To all whom it may concern:*

Be it known that I, WALTER O. LUM, a citizen of the United States, residing at Amsterdam, county of Montgomery, State of New York, have invented certain new and useful Improvements in Controlling Means for Electric Circuits, of which the following is a specification.

This invention relates to the control of electric circuits and has for its object the provision of means whereby an electric circuit may be controlled in a reliable, simple and efficient manner.

My invention relates more specifically to the control of electric motor circuits, one of the objects being to provide means whereby the motor may be automatically started, stopped and generally controlled. In the operation of electric motors it is common to both start the motors and control the speed of the same by means of a resistance which is cut in and out of circuit. Every time a section of resistance is cut out, the current temporarily rises above normal value. The increase in speed which follows the cutting out of a section of resistance immediately reduces the current. During the starting of the motor, therefore, there are a number of temporary rushes of current, one for each section of resistance which is cut out. These sections are frequently cut out of circuit by electromagnetic switches which operate automatically in succession. In order to prevent the switches from operating too rapidly so as to cut out the resistance too rapidly, and increase the current beyond a safe value, various means have been devised. One method of accomplishing this result is by what is known as "current limit control." In this type of control, provision is made for preventing the electromagnetic switches from being closed when the current in the motor circuit exceeds a predetermined value. As heretofore practised, this system has included means for preventing the magnetic switches from being energized while the current is too high. In some switches there is a separate overload or throttle device provided in connection with each switch and in other cases a single overload device controls a plurality of switches. All of these systems, however, involve the use of auxiliary switches or interlocks, shunt coils, etc., which tend to complicate the apparatus and render it more expensive. One of the objects of my invention is to dispense with the auxiliary mechanism and superfluous windings and provide a switch in which the desired result will be attained by a single energizing coil and a single moving switch element.

In carrying out my invention, I provide an electromagnetic switch having an actuating winding which operates to hold the switch open when the exciting current is relatively high and operates to close it when the exciting current is lower. The switch is held open when the exciting current exceeds a predetermined value by a magnetic force which is sufficient to hold it against a force tending to close it. In other words, there are two forces acting upon the switch, one tending to hold it open and the other tending to close it. When the exciting current is relatively high, the force tending to hold it open prevails and when the current is low the force tending to close it prevails. In one form of my invention the force tending to hold the switch open is magnetic in character, while the force tending to close it is partially non-magnetic, as, for instance, where the closing tendency is partially due to the force of gravity or its equivalent, although in some cases both forces may be magnetic. I have found that a very effective device of this character is produced by providing a nearly closed or preferably a completely closed metallic path for the magnetic flux in shunt to the air gap across which the force which holds the switch open acts. This causes the flux which tends to hold the switch open to divide between the two paths inversely as the reluctance of these paths. The reluctance of the path including the air gap being relatively large, the force across this gap, which is the force tending to hold the switch open will be relatively small, but still large enough to overcome the forces tending to close it. With lower energizing current the force across the gap will be so reduced that it will be overcome by the closing force. Other objects and purposes of my invention will appear in the course of the following specification in which I have shown my invention embodied in concrete forms for purposes of illustration.

In the accompanying drawings illustrating my invention, Figure 1 represents a side elevation, partly broken away, of one form of my invention; Fig. 2 is a plan view of the same; Fig. 3 is a section on the line A—A of Fig. 1; Fig. 4 is a section on the line B—B of Fig. 1; Fig. 5 is a diagram of the circuit connections; Fig. 6 is an elevation of another form of my device; Fig. 7 is a plan view of the same; Fig. 8 is a section on the line A—A of Fig. 6; and Fig. 9 is a section of the line B—B of Fig. 6.

Referring first to Figs. 1 to 4, 10 represents a magnet of the solenoid type provided with a movable iron core 11. At the upper end of the solenoid is an iron plate 12 provided with projecting iron lugs 13. The core 11 has a brass rod 14 at its upper end which passes through a central opening in the plate, the rod being separated from the plate by a brass bushing 15. The lower end of the core likewise is provided with a rod, preferably of brass, passing through the bracket 16. This bracket is secured to the U-shaped iron magnet frame 17 through which the core passes. This frame provides two pole pieces 18 and 19, one on each side of the magnet coil. The pole piece 19 is cut away, as shown at 20, and the plate 12 enters the recess and is secured to the magnet frame by screws 21. The plate is spaced from the magnet frame at 22 and also by a brass spacer 23. Pole piece 18 is likewise recesseed to receive the projecting end 24 of the plate and is spaced from the plate by the air space, as shown, as well as by the brass spacer 25. Pivoted in the lugs 13 is a switch operating member 26 having a bracket provided at 27 for carrying the switch member or contact 28. This contact 28 coöperates with the stationary contact 28' mounted upon the insulating base 29 and the spring 29' permits the contacts to engage with a sliding or wiping action. The member 26 consists of parallel bars 30 having a cross bar 30' of considerable mass at one end acting as an armature for the pole piece 19. At the other end is the cross piece 31 of less mass, acting as an armature for the pole piece 18. This armature 31 projects beyond the ends of the pole piece and has wings 32 extending downward so as to overlap the said ends. The member 26, consisting of the bars 30 and the armature 30', is of iron and may be a single casting, such as is shown in the drawing. The armature 31 is secured to the bars 30 by screws 31'. A pivot pin 33, which may be of either brass or iron, passes through the lugs 13 and bars 30. The weight of the operating member is so distributed around the pivot pin 33 that unless otherwise restrained the arm will move downward to the right from the position shown in Fig. 1, so that the contact 28 would tend to engage contact 28'. In order to hold the member in open position, the rod 14 on the core is provided with a brass lug or disk 34 which engages a pin 35 in the switch member. The weight of the core is thus normally applied to the member so as to hold it in open position, as shown in Fig. 1. In this position the end of the switch operating member constituting the armature 31 is held out of contact with the pole piece 18 by a brass screw 36 which is screwed into the armature 31 and abuts against the pole face leaving an air gap at 38. This air gap may be adjusted by adjusting the screw 36.

As thus constructed and arranged, the switch will operate as follows: When the magnet winding 10 is energized by a relatively large current; that is, a current which is higher than that at which the switch is set to close, the core 11 will be raised to the position shown in dotted lines in Fig. 1. This movement releases the switch operating member which would therefore move to closed position were it not for the fact that it is held open by pole piece 18. The path of the magnetic flux which holds the switch member in open position will be from the core 11 through the magnet frame 17, pole piece 18, across the air gap 38, through the armature 31 and parallel bars 30 of the switch operating member to the lugs 13 of the plate 12 and core 11. This path is shunted by a nearly closed metallic path extending from one end of the core 11 through the magnet frame 17 and back to the other end through plate 12 which, as pointed out above, is spaced from the magnet frame 17 at both ends. There will also be a path for the flux from the core 11 around to the right through the pole piece 19, across the air gap 39 to armature 30', but the gap 39 is so wide that little flux will pass into the switch arm through this path. There are thus two forces acting upon the switch member; one force acting across the air gap 38 tending to hold the switch member in open position, and the force of gravity on the other side, together with what magnetic force may exist, tending to close the switch. As the energizing current decreases, the flux across the gap 38 will decrease while the force of gravity acting on the other end of the switch remains the same. When the energizing current has fallen to a predetermined value, the magnetic force across the gap 38 will be overcome by the forces on the opposite end of the switch operating member and the switch will move toward closed position. A considerable amount of flux is shunted to pole piece 18 by plate 12 thereby making the force acting across the air gap 38 relatively small. While the switch is moving toward closed position, the air gap 39 is narrowed and the pull on the armature 30' is increased. When the switch approaches the closed position it is therefore forcibly attracted by the pole piece 19. The switch is therefore closed with a quick snap action. In the meantime the core 11 has been held up and does not fall when the energizing current decreases to the point at which the switch closes because it is actually in contact with the iron plate 12 and sticks or "freezes" in this position. When, however, the current falls to a negligible value, as, for instance, by the failure of voltage, the core will be released and will open the switch with a hammer blow.

In Figs. 6 to 9, I have shown my invention in a somewhat different form. In this case the magnet winding 40 has a fixed core 41 and a U-shaped iron magnet frame 42 is secured to the lower end of the core. The iron plate 43 is set in a recess 44 of pole piece 45 and spaced therefrom as shown. A brass spacer 46 is employed between the plate and the pole piece. The pole piece 47 is secured to the plate by screws 48, a brass spacer 49 being employed between the two parts. The core 41 is secured to the plate 43 by screw 50 and the plate is provided with lugs 51 and 52. An iron switch operating member 53 is pivoted in the lugs 51 and carries at one end the switch member or contact 54 for engaging with the fixed contact 54'. The operating member is provided with a cross bar 55 acting as an armature for the pole piece 45. The opposite end 56 of the operating member is circular in shape and acts as an armature for the pole piece 47. The weight of the member 53 is distributed around the pivotal point so that the switch has a tendency to move toward closed position. It is held from moving to closed position, however, by a lever 57 pivoted in the lugs 52 on a pin 52' which may be of either brass or iron. This lever is U-shaped so as to surround the armature 56 and a brass pin 58 passing through the two ends of the lever moves in a slot 59 in the member 53. The member 53 is recessed at 58' so as to permit the pin 52' to enter the recess when the parts are in the position shown in Fig. 6. The lever 57 is forced into the position shown in Fig. 6 by a compression spring 56' which forces the pin 58 against the lower end of the slot 59, thereby holding the switch member in open position. The armature portion 56 is held out of engagement with the pole piece 47 by a brass screw 60 so as to leave an air space 61. This space may be adjusted by means of the screw 60.

In order to change the flux across the air gap 61 when the energizing current varies, I arrange the outer end of the lever 57 in the form of an armature and so position it that when it is attracted by the pole piece 47 it will come into contact with the pole piece 47 and also with the iron plate 43. This lever 57 therefore acts to complete a metallic shunt around the path containing the air gap 61. The flux, therefore, will have a better path from the plate 43 across the lever 57 to the pole piece 47, than it will have through the lugs 51, switch arm 53 and air gap 61. The lever 57 therefore acts as a shunt to the air gap 61 and greatly reduces the flux across the gap. When the energizing current is relatively high the flux across the air gap will be relatively high, and when the current is low the flux will be correspondingly low.

The operation of this form of device will be as follows: When a relatively high energizing current is passed through the coil 40, the lever 57 will be pulled downward into engagement with the pole piece 47, thereby establishing a metallic shunt around the air gap 61. The moving of the lever into this position removes the bias from the switch operating member but the latter will not move to closed position since it is held by the attraction across the air gap 61. The path of the flux is from core 41 through the magnet frame 42, pole piece 47, across the air gap 61, switch operating member 53, lugs 51 to plate 43. There is also a path in parallel with the gap 61 from the pole piece 47 across the lever 57, to plate 43. There is also a path for the flux from the core 41 through the magnet frame 42, pole piece 45, across the air gap 62 to the armature 55 of the switch lever and through the lugs 51 to plate 43. The air gap 62 being relatively wide, however, a relatively small amount of flux passes across it. The result is that when the current in the coil is high, the lever 57 being held down in engagement with the pole piece 47, the flux across the air gap is relatively high, although it constitutes only a fraction of the total flux. The flux is sufficient to hold the member 53 against the force of gravity tending to move the member to closed position. When the current falls to a lower value the flux across the gap will be reduced to such a point that the attraction across the gap will be overcome by the force of gravity on the opposite end of the lever acting in conjunction with the pull across the gap. 62. The falling of the current to the lower value does not release the lever 57 since it is in engagement with the pole piece and forms a closed magnetic circuit, thereby sticking or freezing to the pole piece. When, however, the current falls to an inappreciable value, as, for instance, by failure of voltage, the lever 57 will be forced away from the pole piece by the spring 56' and the switch will be moved to open position. The switch member in this case is arranged so that it moves by gravity to the closed position when not otherwise restrained, but my invention is in no sense limited to this arrangement, since the parts may be so arranged and proportioned that when the current falls to a predetermined value, the force across the air gap 62 will be greater than that across the air gap 61. It will be noted also that the leverage of the armature 56 is much longer than that of the armature portion 55 so that the magnetic force acting upon the portion 56 may be much less than that upon the armature 55 and still the switch would be held open.

In Fig. 5 I have shown a motor control system embodying a plurality of my electromagnetic switches. Referring to this diagram, A represents the armature and F the shunt field of the motor. R, R' and R² represent sections of resistance and S, S' and S² represent electromagnetic switches constructed in accordance with my invention. When the line switch L is closed, current will pass from the plus main through the armature A, resistance sections R², R', R through the winding $w$ of switch S to the negative main. The closing of the switch L causes a rush of current above the normal, but as the speed of the motor armature rises, this current is reduced by the counter electromotive force of the motor. Upon the first rush of current, the switch S does not close by reason of the construction of the switch, as heretofore described. When, however, the current falls to the predetermined value, due to the speeding up of the motor, the switch S closes. The closing of the switch S energizes the winding $w'$ of the switch S' and also short circuits the resistance section R. The windings $w$ and $w'$ are, of course, of low resistance. The short circuiting of the resistance section R causes another rush of current which causes the motor to further speed up. When the current falls to the predetermined value, due to the further increase of speed of the motor, the switch S' closes, thereby short circuiting the resistance section R' through the winding $w^2$ of switch S². In a similar manner, the switch S² will close when the current reaches a predetermined value and short circuit the resistance R², leaving the motor connected across the line in series with the low resistance windings $w, w'$ and $w^2$. Upon failure of voltage these switches will open automatically and in order to again start the motor it will be necessary that the switches again close in the same order.

While I have described my invention as embodied in concrete form for purposes of illustration, it should be understood that I do not limit my invention thereto, since various modifications thereof will suggest themselves to those skilled in the art without departing from the spirit of my invention, the scope of which is set forth in the annexed claims, some of which are directed to novel features of construction and operation of the switch by the current in the controlled circuit without reference to the number of windings employed.

What I claim as new and desire to secure by Letters Patent of the United States, is,—

1. A controlling device for electric circuits comprising a switch member, an electromagnet for holding the same in closed position, and means whereby the magnet holds the switch member from closing when the current is relatively high and permits it to be closed when the current falls to a predetermined value.

2. A controlling device for electric circuits comprising a switch member normally biased to open position, an electromagnet for holding the same in closed position, and means whereby said magnet holds the switch member in open position when the current is relatively high and permits it to close when the current falls to a predetermined value.

3. A controlling device for electric circuits comprising a switch member, an electromagnet for holding the same in closed position, and means whereby the flux of said magnet holds the switch member open when the current is relatively high and permits it to close when the current falls to a predetermined value.

4. A controlling device for electric circuits comprising a switch operating member, an electromagnet for holding the same in closed position, and coöperating therewith across an air gap to hold it in open position when the current is relatively high, and a magnetic element arranged in shunt to said air gap to cause the flux through the air gap to decrease so as to allow the switch to close when the current falls to a predetermined value.

5. A controlling device for electric circuits comprising a switch operating member, an electromagnet coöperating with one end of said operating member to hold the switch in closed position and coöperating with the opposite end of the member across an air gap to hold the member in open position when the current is relatively high, and a magnetic element arranged in shunt to said air gap to cause the flux across said air gap to decrease so as to allow the operating member to move to closed position when the current falls to a predetermined value.

6. A controlling device for electric circuits comprising a pivoted switch operating member, an electromagnet coöperating with one end of said switch member to hold the switch in closed position and coöperating with the opposite end of the member across an air gap to hold the member in open position when the current is relatively high, and a magnetic element arranged in shunt to said air gap to cause the flux through the air gap to decrease so as to allow the switch operating member to move to closed position when the current falls to a predetermined value.

7. A controlling device for electric circuits comprising a movable switch operating member biased to open position, an electromagnet for removing said bias, means whereby said magnet holds said member in its normal position after the bias is removed and releases it when the current in the magnet decreases to a predetermined value said magnet holding the switch in closed position.

8. A controlling device for electric circuits comprising a switch operating member having two armature portions, an electromagnet coöperating with one armature portion to hold the switch closed and with the other armature portion to hold it open, and means whereby the flux of said magnet acts upon one armature portion to hold the switch operating member in open position when the current is relatively high and allows it to close when the current falls to a predetermined value.

9. A controlling device for electric circuits comprising a switch operating member having two armature portions, an electromagnet coöperating with one of said armature portions to hold the switch closed and coöperating with the other armature portion across an air gap to hold it open, and a magnetic element arranged in shunt to said air gap to cause the flux across said air gap to decrease and allow the switch to close when the current falls to a predetermined value.

10. A controlling device for electric circuits comprising a switch operating member pivoted intermediate its ends and having a contact at one end biased to open position, an electromagnet for holding said contact in closed position, and means whereby the opposite end of said member is held by the magnet when the current is relatively high to keep the contact in open position until the current falls to a predetermined value.

11. A controlling device for electric circuits comprising a switch operating member pivoted intermediate its ends and having a contact at one end biased to open position, an electromagnet for holding said contact in closed position and coöperating with the opposite end of said member across an air gap to hold it in open position when the current is relatively high, and a magnetic element arranged in shunt to said air gap to cause the flux across said air gap to decrease and allow the contact to move to closed position when the current falls to a predetermined value.

12. In a series type switch for controlling a resistance in the circuit of an electric motor or similar device, the combination of a magnet winding, a switch operating member biased to a position in which the switch is open when said winding is deënergized, and means whereby on energization of said winding by a current above a predetermined value there exist two forces acting on said member, first a force tending to move said member in the direction to close the switch and second a magnetic force set up by said winding holding said member in its open position, and means whereby the reduction of the said magnetic force, due to the reduction of current in said winding to said predetermined value, permits the first force to predominate and move said member to close the switch, and means whereby the said member is retained in position to hold the switch closed and will be so retained until said winding is deënergized, irrespective of increase of current in said winding.

13. The combination of a circuit to be controlled, and a series of switches therefor, adapted to operate in a predetermined order, and each provided with a controlling magnet winding, the magnet winding of each of certain switches being brought into said circuit by the closure of a preceding switch and delaying the operation of the switch which it controls and later holding the said switch in its operated position.

14. The combination of a circuit to be controlled, and a series of switches therefor, adapted to operate in a predetermined order, each provided with a controlling magnet winding, the magnet winding of each of certain switches being normally deënergized and brought into said circuit by the closure of a preceding switch and delaying the operation of the switch which it controls and connections for including each winding in series with the switch it controls when it operates.

15. The combination of a circuit to be controlled, and a series of controlling devices therefor, adapted to operate in a predetermined order, each comprising a switch member, an electro-magnet for holding the same in a closed position, and means whereby the magnet holds the switch member from closing when the current is relatively high and permits it to be closed when the current falls to a predetermined value, the magnet winding of each of certain of said electromagnets being brought into the said circuit by the closure of a preceding switch member and delaying the operation of the switch member which it controls.

16. The combination of a circuit to be controlled, and a plurality of series type switches therefor, adapted to operate in a predetermined order, each comprising a magnet winding, a switch operating member biased to a position in which the switch is open when said winding is deënergized, and means whereby on energization of said winding by a current above a predetermined value there exist two forces acting on said member, first, a force tending to move said member in a direction to close the switch and, second, a magnetic force set up by said winding holding said member in its open position, and means whereby the reduction of the said magnetic force, due to the reduction of current in said winding to the said predetermined value, permits the first force to predominate and move said member to close the switch, and means whereby the said member is retained in position to hold the switch closed and will be so retained until said winding is de-energized, irrespective of increase of current in said winding, the magnet winding of each of certain switches being brought into the said circuit by the closure of a preceding switch and delaying the operation of the switch which it controls when the current in the circuit is above the predetermined value.

17. A circuit to be controlled, a switch including a switch member controlling the circuit, a magnetic path in which flux is set up by the current in said circuit to hold the switch member from operating to close the switch when the current is relatively high but permitting the switch member to close the switch when the current is relatively low, and a magnetic path in which flux is set up by the current in said circuit to hold the switch member closed.

18. A circuit to be controlled, a switch member normally biased to open position controlling the circuit, magnetic means controlled by the current in said circuit acting upon the switch member to reinforce the bias and hold the switch member in open position when the current is relatively high but permitting the switch member to move to closed position when the current drops to a predetermined value, and magnetic means controlled by the current in said circuit acting upon the switch member to hold it closed.

19. A controlling device for electric circuits comprising a switch member pivoted intermediate its ends and having a contact at one end biased to the open position, electromagnetic means energized by the current in the controlled circuit acting on one side of the pivot to hold the contacts in open position until the current in the circuit drops to a predetermined value and electromagnetic means energized by said current in the controlled circuit acting on the member on the opposite side of the pivot to hold the contacts in closed position.

20. A controlling device for electric circuits comprising a switch member pivoted intermediate its ends and having a contact at one end biased to the open position, an armature portion carried by said switch member on one side of the pivot, an electromagnetic pole piece energized by the current in the controlled circuit acting on said armature portion to hold the switch member in open position until the current in the circuit drops to a predetermined value, a second armature portion carried by said switch member upon the opposite side of said pivot and an electromagnetic pole piece energized by said current in the controlled circuit acting upon said second armature portion to hold the contacts in closed position.

In witness whereof I have hereunto set my hand this 24th day of February, 1911.

WALTER O. LUM.

Witnesses:
 BENJAMIN B. HULL.
 HELEN ORFORD.